UNITED STATES PATENT OFFICE 2,574,741

MODIFIED MELAMINE RESINS

Richard H. Hunt, Jr., and Theodore P. Malinowski, Springfield, Mass., assignors to Monsanto Chemical Company, St. Louis, Mo., a corporation of Delaware No Drawing. Application March 25, 1950,
Serial No. 151,988

9 Claims. (Cl. 260—21)

This invention relates to new surface coating resins. More particularly, the invention relates to modified melamine ether surface coating resins.

The methylol melamine ethers have been used quite successfully in combination with alkyd resins and drying oils to obtain surface coating compositions which cure to hard glossy insoluble films. However, in order to cure the films to the insoluble state, it has been necessary to carry out the curing step at elevated temperatures such as from 100° C. to 200° C.

One object of this invention is to provide new surface coating resins.

A further object is to provide surface coating resins which will cure at relatively low temperatures.

Still another object is to provide modified methylol melamine ethers.

These and other objects are attained by reacting dicyclopentadiene with methylol melamine and an alcohol.

The following examples are given in illustration and are not intended as limitations on the scope of this invention. Where parts are mentioned, they are parts by weight.

Example I

A reaction mixture was prepared by adding to a reaction vessel, 280 parts (1 mol) of pentamethylol melamine, 134 parts (1 mol) of dicyclopentadiene and 450 parts (6 mols) of n-butanol and then acidifying the mixture with formic acid to a pH of about 5. The reaction mixture was heated at reflux temperature and atmospheric pressure for about 1 hour and then subjected to azeotropic distillation to remove water formed during the reaction. The product was a butanol solution of a butyl ether of methylol melamine modified with dicyclopentadiene. On removal of the solvent, a soft white powder was obtained which cured to the insoluble infusible state by moderate heating at from 30° C. to 50° C.

Example II

A portion of a butanol solution obtained as in Example I was partially concentrated by removal of butanol and then xylol was added to obtain a solution containing 50% resin by weight in a 50–50 butanol-xylol solvent. An equal amount by weight of a xylol solution of a dehydrated castor oil-modified alkyd resin containing 50% solids was mixed with the solution of the modified melamine resin. Steel panels were coated with the resulting composition and the solvent was allowed to evaporate. The coatings cured to an insoluble infusible state in about 4 hours at 30° C. Similar coatings made from a butylated methylol melamine without the dicyclopentadiene did not cure at 30° C.

Example III

A resin similar to that of Example I was prepared by reacting 126 parts (1 mol) of melamine with 165 parts (5.5 mols) of formaldehyde, 134 parts (1 mol) of dicyclopentadiene and 450 parts (6 mols) of butanol at a pH of about 8. The reaction was carried out at reflux temperature and atmospheric pressure for about 1 hour. Thereafter, the reaction medium was acidified to about pH 5 with formic acid and refluxing was continued for about one-half hour. Water was removed by azeotropic distillation, excess butanol was removed until a 70% solids solution was obtained and then xylol was added to obtain a 50% solids solution. This product was compatible with dehydrated castor oil-modified alkyds and the resulting coating compositions could be cured at relatively low temperatures.

The solution of Example III was also compatible with other oil-modified alkyds in which the castor oil was replaced by other drying and semi-drying oils such as linseed oil, soy bean oil, oiticica oil, etc. Coatings prepared from mixtures of the oil-modified alkyd resins and the dicyclopentadiene-modified butylated methylol melamine could be cured at temperatures from 25° C. to 200° C.

The solutions of Example III were also compatible with the drying and semi-drying oils without the alkyd resin. Coatings prepared with the drying oils cured at low temperatures at a faster rate than that of the oils alone. In addition, the cured films were harder and glossier and had better weather and alkali resistance.

Example IV

Example III was repeated except that the amount of dicyclopentadiene was increased 1.5 mols. The reaction proceeded in the same manner and the product was generally similar to that of Example III except that the curing rate at low temperatures was somewhat faster.

Example V

Melamine was reacted with dicyclopentadiene, formalin (37% aqueous formaldehyde) and methanol in the proportions of 1 mol of melamine, 3 mols of dicyclopentadiene, 8 mols of formaldehyde and 6 mols of methanol. The reaction was carried out under reflux temperature and atmospheric pressure at a pH of about 9 for about 1 hour. The reaction medium was then made acid to about pH 5 with formic acid and refluxing was continued for about 1 hour. The product was dehydrated and concentrated and then xylol was added to yield a 50% solids solution of resin in xylol-methanol mixture. Drying oils, semi-drying oils and oil-modified alkyd resins were compatible with the modified melamine resins and coating prepared therefrom could be cured at relatively low temperatures.

*Example VI*

Example III was repeated except that the amount of dicyclopentadiene was reduced to about 0.5 mol. The product was generally similar to that of the prior examples and was compatible with drying oils and drying oil-modified alkyd resins and could be cured at relatively low temperatures although the rate of cure was considerably slower than that of the resin of Example III.

In order to prepare the resins of this invention, there are several critical details to be observed. In the first place, the methylol melamine should contain from 3 to 6 methylol groups. Secondly, the dicyclopentadiene should be used in amounts ranging from 0.5 to 3 mols per mol of combined melamine. Thirdly, the alcohol should be an unsubstituted aliphatic alcohol containing from 1 to 8 carbon atoms.

In the preparation of the resins, two methods may be used. Example I is an illustration of the first method wherein the methylol melamine is prepared prior to the reaction with the alcohol and the dicyclopentadiene. In this method, the reaction is carried out at a pH of from 4 to 7 generally under reflux conditions at atmospheric pressure. Lower temperatures may be used if desired but the reaction proceeds most smoothly and rapidly under refluxing conditions.

The second method for preparing the resins of this invention is illustrated in Example III wherein all of the ingredients are added to the reaction vessel at the same time. The reaction is then carried out in two steps which differ only in the pH of the reaction medium. The first step is carried out at a pH of from 7 to 10 and most advantageously at a pH of from 8 to 9. The second step is carried out at a pH of from 4 to 7. Both steps are preferably maintained under reflux conditions at atmospheric pressure until the reaction is completed.

Water may be removed from the product of the reaction by straight distillation or by azeotropic distillation depending upon the nature of the alcohol used. Thus, with butanol, azeotropic distillation is necessary whereas with methanol, no azeotrope is formed and the water may be removed directly.

For most uses, it is unnecessary and frequently undesirable to recover the resins from the excess alcohol solvent. The solutions are generally concentrated to such an extent that they can be diluted with other coating solvents or diluents such as xylol, benzol, hexanes, etc. to obtain a coating solution having the desired solids content.

The amount of formaldehyde used to prepare the resins may be varied from 3 to 6 mols per mol of melamine. Frequently, it is advantageous to use an excess of formaldehyde up to 8 mols thereof in order to expedite the forming of the methylol melamine.

The amount of alcohol used should be substantially in excess of the amount needed for the reaction since the alcohol acts as a solvent both for the reaction and for the completed resin. In general, from 4 to 8 mols of alcohol should be used per mol of melamine.

It has been found that drying oils and semi-drying oils and alkyd resins modified with said oils are compatible with the modified melamine resins to the extent of 100 parts of oil per 100 parts of resin. Compositions prepared from mixtures of the oils or oil-modified alkyd resins with the modified melamine resins may be cured without the addition of curing catalysts at relatively low temperatures. The curing rate varies directly with the amount of dicyclopentadiene reacted with the methylol melamine ether. Thus, when 0.5 mol of dicyclopentadiene is used per mol of melamine, the coatings prepared therefrom with drying oils take about 8 hours to cure to the insoluble infusible state at 30° C. This curing time may be considerably shortened by raising the temperature to 100° C. or 150° C. On the other hand, if 3 mols of the dicyclopentadiene are reacted with the methylol melamine ether, the mixtures of the resin with drying oils cure in about 2 hours at 30° C. and extremely rapidly at elevated temperatures.

In spite of the low temperature curing characteristics of the coating compositions, they are stable to storage over extended periods of time providing that the solvent is not removed therefrom.

Among the drying and semi-drying oils that may be used are linseed, dehydrated castor, tung, oiticica, perilla, cashew nut shell, sunflower, cottonseed, rapeseed, soya bean etc. oils. Each of these oils are compatible with the resins of this invention up to about 100 parts of oil per 100 parts of resin. Coatings prepared therefrom cure at relatively low temperatures to tough, glossy insoluble films having excellent weather and alkali resistance.

The oil-modified alkyd resins which may be used are saturated alkyd resins derived from polyhydric alcohols and polycarboxylic acids which have been further reacted with drying or semi-drying oils or the acids derived therefrom. For example, the dehydrated castor oil-modified alkyd resin of Example II was prepared from about 1 mol of glycerin, about 2 mols of phthalic anhydride and about 1 mol of dehydrated castor oil.

The dicyclopentadiene-modified melamine ether resins are particularly advantageous for use in admixture with drying oils and semi-drying oils and alkyd resins modified therewith since such coating compositions may be cured at relatively low temperatures to provide coatings which are hard, tough, glossy and resistant to weathering and alkalies.

It is obvious that many variations may be made in the products and processes of this invention without departing from the spirit and scope thereof as defined in the appended claims.

What is claimed is:

1. A heat reaction product of 1 mol of a methylol melamine containing from 3–6 methylol groups, from 4–8 mols of a saturated monohydric unsubstituted aliphatic alcohol containing from 1–8 carbon atoms and from 0.5 to 3 mols of dicyclopentadiene.

2. A product as in claim 1 wherein the alcohol is methanol.

3. A product as in claim 1 wherein the alcohol is n-butanol.

4. A coating composition comprising an organic solvent solution of a mixture of a compound taken from the group consisting of drying oils, semi-drying oils and saturated alkyd resins modified with said oils, and a heat reaction product of 1 mol of a methylol melamine containing from 3-6 methylol groups with from 4-8 mols of an aliphatic saturated monohydric unsubstituted alcohol containing from 1-8 carbon atoms and from 0.5 to 3 mols of dicyclopentadiene.

5. A coating composition as in claim 4 wherein the compound is a dehydrated castor oil-modified alkyd resin.

6. A coating composition as in claim 5 wherein the alcohol is n-butanol.

7. A process which comprises reacting 1 mol of melamine with from 3-6 mols of formaldehyde, from 0.5 to 3 mols of dicyclopentadiene and from 4-8 mols of an aliphatic saturated monohydric unsubstituted alcohol containing from 1-8 carbon atoms, at a pH of from 7-10 under reflux conditions at atmospheric pressure, acidifying the resultant reaction mixture at a pH of from 4-7 and continuing the reaction at reflux temperature and atmospheric pressure.

8. A process as in claim 7 wherein the alcohol is methanol.

9. A process as in claim 7 wherein the alcohol is n-butanol.

RICHARD H. HUNT, Jr.
THEODORE P. MALINOWSKI.

No references cited.